United States Patent [19]
Yasuda

[11] Patent Number: 5,253,042
[45] Date of Patent: Oct. 12, 1993

[54] BURST PHASE DETECTION CIRCUIT

[75] Inventor: Yoshihiro Yasuda, Kanagawa, Japan

[73] Assignee: Sony Corporation, Tokyo, Japan

[21] Appl. No.: 805,628

[22] Filed: Dec. 12, 1991

[30] Foreign Application Priority Data

Dec. 19, 1990 [JP] Japan .................................. 2-412166

[51] Int. Cl.$^5$ ............................................ H04N 9/455
[52] U.S. Cl. ........................................ 358/19; 358/10
[58] Field of Search .................... 358/10, 19, 20, 21 R

[56] References Cited

U.S. PATENT DOCUMENTS

4,734,757 3/1988 Akiyama ................................ 358/19

FOREIGN PATENT DOCUMENTS

1-194789 8/1989 Japan .
2-305193 12/1990 Japan .

*Primary Examiner*—Mark R. Powell
*Attorney, Agent, or Firm*—William S. Frommer; Alvin Sinderbrand

[57] ABSTRACT

A burst phase detection circuit is provided for detecting a phase difference between an input burst signal having a predetermined phase relation with a carrier of a modulated color signal and a sampling pulse. The circuit detects such phase difference based upon a digital signal obtained by demodulating the color signal in accordance with a demodulation axis of one of first and second color difference signals of the color signal. The circuit includes a first sampling circuit which samples a value of the digital signal during an interval of the burst signal within a first horizontal line period of the color signal, and a second sampling circuit for sampling a value of the digital signal during an interval of the burst signal within a second horizontal line period of the color signal. A digital adding circuit is provided for adding the values of the digital signal sampled by the first and second sampling circuits to produce an addition signal. A detection circuit serves to digitally detect a direction and an amount of a phase difference between the sampling pulse and the burst signal based on the addition signal.

5 Claims, 4 Drawing Sheets

BURST PHASE DETECTION CIRCUIT

BACKGROUND OF THE INVENTION

1. Field of the Invention

The present invention relates to a burst phase detection circuit, in particular, relates to a burst phase detection circuit suitable for burst lock loop of a color video signal.

2. Description of the Prior Art

Color video signals contain a color signal where a carrier is modulated with first and second color difference signals. To digitally demodulate this color signal, the phase of a sampling clock for demodulating a particular color should be in synchronization with that of a color burst signal being input. If the phase of the sampling clock is not in synchronization with that of the color burst signal, the sampling value, that is, the demodulation output contains an error. Thus, the color cannot be correctly reproduced. With a conventional technique for controlling the phase of a sampling clock, data of the color burst signal being digitized is converted into an analog DC value by means of a D/A converter. Thereafter, the burst lock loop is controlled in accordance with the DC value.

The above mentioned prior art disadvantageously requires a D/A converter and the various associated circuit blocks for controlling the phase synchronization in accordance with the color burst signal of the sampling clock. Since it is difficult to include the D/A converter and the associated circuit blocks along with the circuit blocks for the phase control function of the sampling clock in an IC chip, the D/A converter and the associated circuit blocks should be externally provided.

OBJECTS AND SUMMARY OF THE INVENTION

Therefore, an object of the present invention is to provide a burst phase detection circuit which allows the phase of a sampling clock to be in synchronization with a color burst signal in a simpler construction than the prior art, namely, without the necessity of a D/A converter and the various associated circuit blocks.

According to an aspect of the present invention, there is provided a burst phase detection circuit for receiving input signals including a color signal, which is produced by modulating a carrier with a first color difference signal and a second color difference signal, and a burst signal with a particular phase relation with the carrier and for generating a sampling pulse which is in synchronization with the burst signal comprising, a first sampling circuit for sampling a value during a period of the burst signal, said value being a digital signal which is obtained by demodulating the modulated color signal with one of demodulation axes of the first color difference signal and the second color difference signal a second sampling circuit for sampling a value during a period of the burst signal in a horizontal period which has not been sampled by the first sampling circuit, the demodulated digital signal is supplied to the second sampling circuit, a digital addition circuit for adding an output signal from the first sampling circuit and an output signal from the second sampling circuit, and a detection circuit for digitally detecting the direction and amount of a phase difference between generated sampling pulse and the burst signal of the input signals in accordance with an output of the digital addition circuit.

The above, and other, objects, features and advantages of the present invention will become readily apparent from the following detailed description thereof which is to be read in connection with the accompanying drawings.

DETAILED DESCRIPTION OF THE PREFERRED EMBODIMENT

Figure 1:
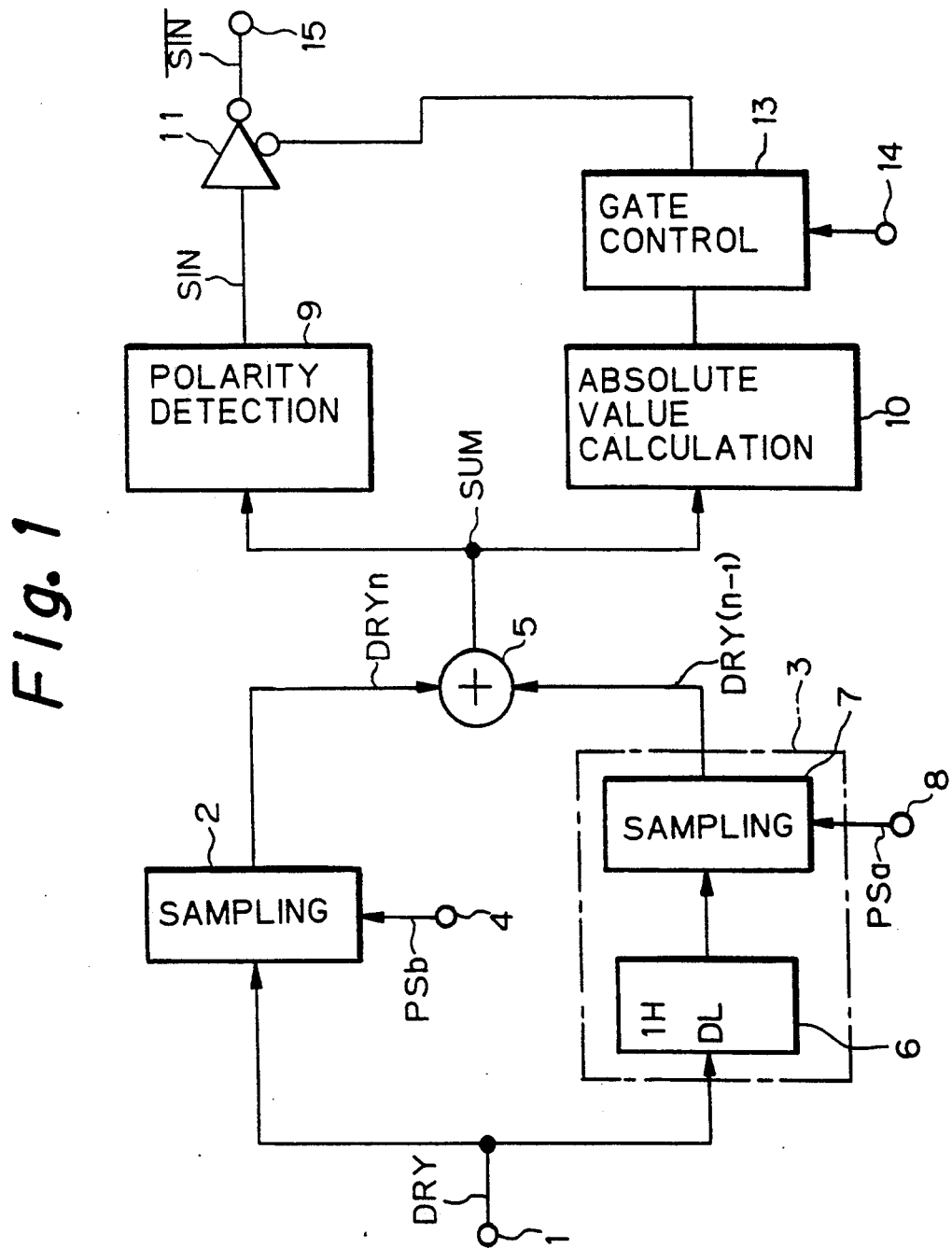
FIG. 1 is a block diagram of a burst phase detection circuit according to the present invention.

Now, an embodiment according to the present invention will be described with reference to FIGS. 1 to 5. FIG. 1 is a block diagram showing the construction of a burst phase detection circuit.

Before describing the details of the embodiment, the fundamental concept of the present invention is discussed. According to the present invention, by digitally adding levels of signal portions according to chroma signals such as color burst signals BTc of color difference signals (R−Y) which are demodulated on two adjacent lines, the direction and the amount of the phase difference between the sampling clock SCK and the color burst signal BTc at that time are detected. In other words, when the phase of the sampling clock SCK is in synchronization with that of the color burst signal BTc, the component of the color difference signal (R−Y) is not output when the color difference signal (R−Y) is in accordance with the color burst signal BTc, namely during a period TBU. However, when the sampling clock SCK is not in synchronization with the color burst signal BTc, namely, when there is a phase difference, the component of the color difference signal (R−Y) is output during the period TBU (while the color difference signal (R−Y) is in accordance with the color burst signal BTc). Therefore, when the polarity of the phase of the color difference signal (R−Y) and the amount of phase difference are obtained, the direction and amount of the phase difference between the color burst signal BTc and the sampling clock SCK can be obtained. The information concerning the direction and amount of the phase difference are output as a PWM signal. The phase of the sampling clock SCK is controlled in accordance with the output of the PWM signal.

In the construction as shown in FIG. 1, data DRY of a color difference signal (R−Y) which has been demodulated and digitized is supplied to a first sampling circuit 2 and a second sampling circuit 3 through a terminal 1.

The data DRY is represented in for example two's complement notation.

With reference also to FIGS. 3A and 3B first sampling circuit 2 samples the data DRY during a period TBU in accordance with a color burst signal BTc by means of a sampling pulse PSb which is supplied through a terminal 4. The resultant signal is supplied to an addition circuit 5. The first sampling circuit 2 samples data DRYn of an n-th line which is the current line as shown in FIGS. 3A and 3B. In other words, when the video signal for use is in the NTSC system, a sampling value VbN of an n-th line, which is the current line, is obtained as shown in FIG. 3A. On the other hand, when the video signal for use is in the PAL system or in the PAL-M system, a sampling value VbP of the data DRYn of the n-th line, which is the current line, is obtained as shown in FIG. 3B.

The second sampling circuit 3 comprises a 1 H delay circuit 6 and a sampling circuit 7. The 1 H delay circuit 6 delays the supplied data DRY for one horizontal scanning period and supplies the resultant signal to the sampling circuit 7. The sampling circuit 7 samples the data DRY during the period TBU in accordance with the color burst signal BTc by means of the sampling pulse PSa which is supplied through a terminal 8 and supplies the resultant signal to the addition circuit 5.

Figure 3:
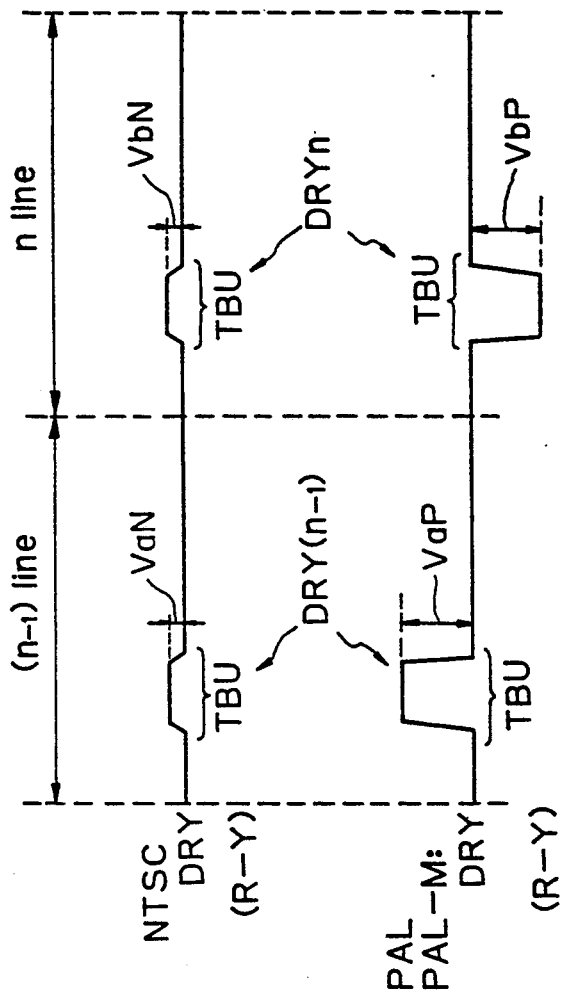
FIGS. 3A and 3B together comprise a schematic diagram showing sampling states of two adjacent lines.

The second sampling circuit 3 samples data DRY(n−1) of an (n−1)th line which is a 1 H earlier line as shown in FIG. 3. In other words, when the video signal for use is in the NTSC system, a sampling value VaN of the data DRY(n−1) of the (n−1)th line, which a 1 H earlier line, is obtained as shown in FIG. 3A. On the other hand, when the video signal for use is in the PAL system or in the PAL-M system, a sampling value VaP of the data DRY(n−1) of the (n−1)th line, which a 1 H earlier line, is obtained as shown in FIG. 3B.

The addition circuit 5 adds the data DRYn supplied from the first sampling circuit 2 and the data DRY(n−1) supplied from the second sampling circuit 3. In other words, the addition circuit 5 adds the sampling value vbN (or VbP) and the sampling value VaN (or VaP). The obtained addition output SUM is supplied to a polarity detection Circuit 9 and an absolute value circuit 10.

The sampling value VaP or VbP shown in FIG. 3B is used when the video system for use is in the PAL system or the PAL-M system. In this case, unlike the NTSC system, since the polarity of the color difference signal (R−Y) is inverted line by line, the polarity of the data DRYn or DRY(n−1) supplied from the second sampling circuit 3, which is the polarity of the sampling value vaP or VbP, is inverted line by line as shown in FIG. 3B.

The polarity detection circuit 9 detects the polarity of the data in accordance with the MSB (sign bit) of the addition output SUM represented in the two's complement notation and latches the resultant value. The polarity detection circuit 9 outputs a signal SIN which represents the polarity to a tri-state inverter 11. The polarity represents the advance and delay of the phase of the sampling clock against that of the color burst signal BTc. For example, the polarity "+" represents that the demodulation axes formed with the color difference signals (R−Y) and (B−Y) are rotated in the clockwise direction CW. On the other hand, for example, the polarity "−" represents that the demodulation axes are rotated in the counterclockwise direction CCW.

Figure 5:
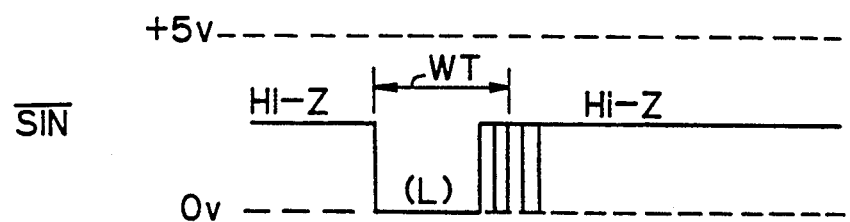
FIG. 5 is a schematic diagram describing an output of the burst phase detection circuit of FIG. 1 under the condition that the phase of the sampling clock is faster than that of the color burst signal in the clockwise direction.
Figure 6:
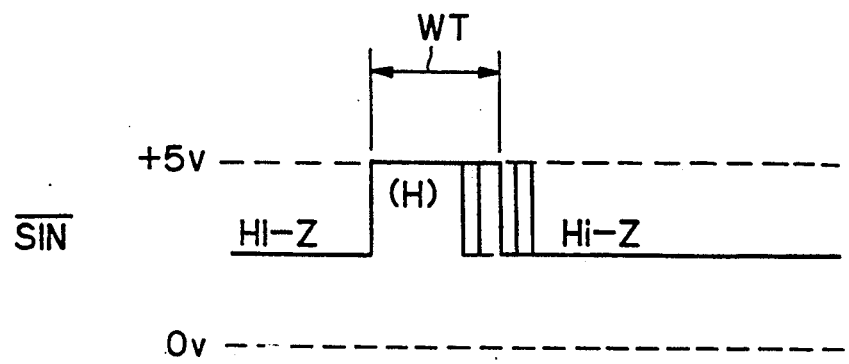
FIG. 6 is a schematic diagram describing an output of the burst p detection circuit of FIG. 1 under the condition that the phase of the sampling clock is faster than that of the color burst signal in the counterclockwise direction.

The absolute value circuit 10 calculates the absolute value of the addition output SUM and supplies the resultant value to a gate control circuit 13. When the gate control circuit 13 receives the absolute value of the addition output SUM supplied from the absolute value circuit 10, it holds the absolute value and counts clock pulses supplied through a terminal 14 in accordance with the absolute value. While the gate control circuit 13 is counting the clock pulses, the output signal level of the circuit 13 goes low thereby controlling the inverter 11. Therefore, while the clock pulses in accordance with the absolute value of the addition output SUM are being counted, the inverter 11 outputs a polarity inverted signal SIN*, which is held by the polarity detection circuit 9 (in this specification, the negative logic symbol is represented with *), as a PWM signal from a terminal 15. The pulse width WT of the signal SIN* is defined by the absolute value of the addition output SUM as shown in FIG. 5 and FIG. 6 and as was described above. The inverter 11 inverts the output of the polarity detection circuit 9 so as to offset the advance and delay of the phase of the sampling clock SCK against that of the color burst signal BTc.

Figure 4:
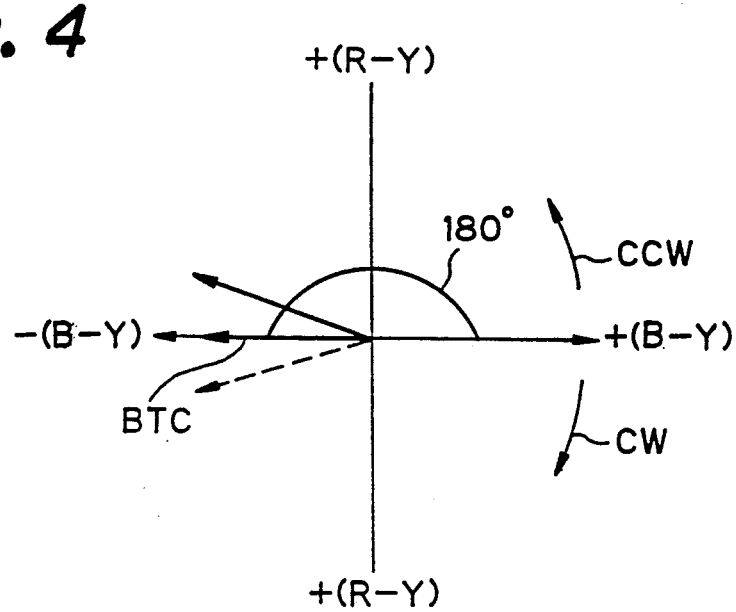
FIG. 4 is a schematic diagram describing phase rotation in accordance with a color burst signal.

As shown in FIG. 4, when the phase of the sampling clock SCK differs from that of the color burst signal BTc in the clockwise direction CW, the signal SIN* which is in the low level is output as shown in FIG. 5. On the other hand, when the former phase differs from the later phase in the counterclockwise direction CCW as shown in FIG. 4, the signal SIN* which is in the high level is output. When the former phase matches the latter phase without phase difference, high impedance Hi-Z takes place. Therefore, the more the addition output SUM approaches "zero", the more the phase of the sampling clock SCK becomes synchronous with that of the color burst signal BTc. Thereby, synchronous lock takes place.

Figure 2:
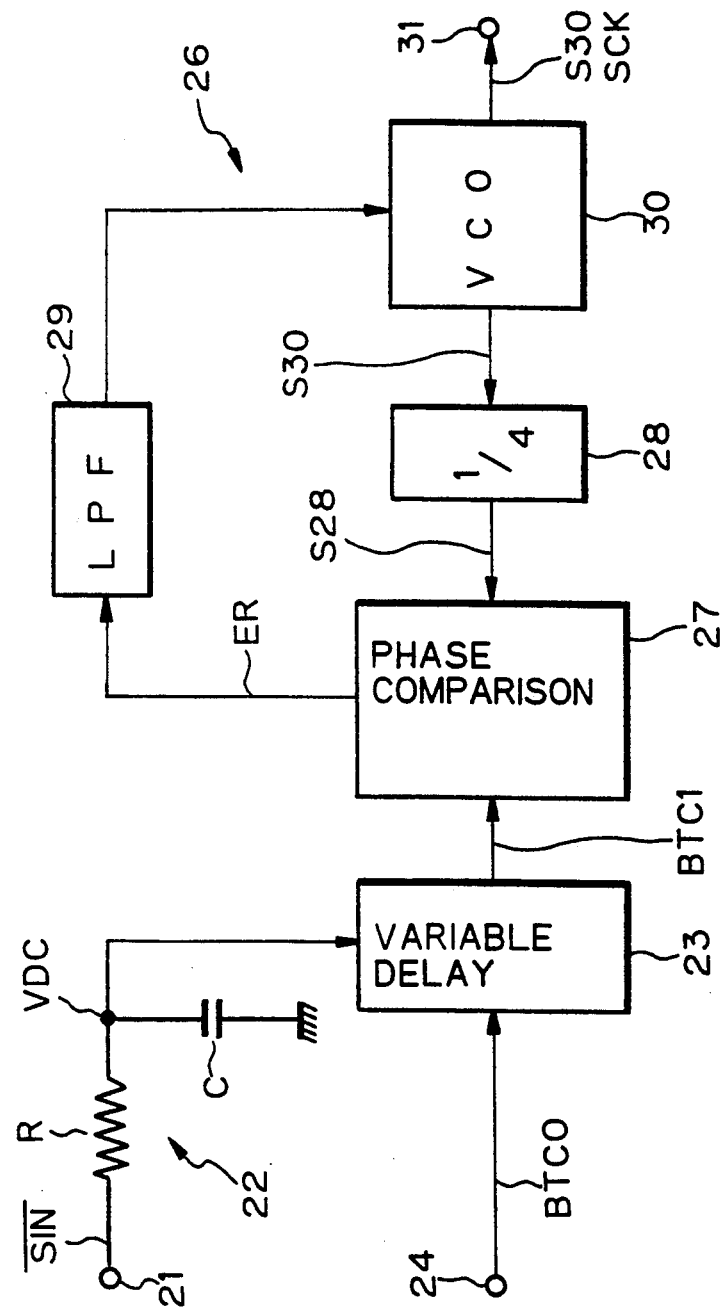
FIG. 2 is a block diagram of a circuit block for generating a sampling clock.

The above mentioned signal SIN* is supplied to an integration circuit 22 comprising a resister R and a condenser C through a terminal 21 as shown in FIG. 2 thereby producing a DC voltage. The DC voltage is supplied to a variable delay circuit 23 as a control signal VDC. On the other hand, the color burst signal BTc0 which is successively generated in accordance with the color burst signal BTc is supplied to the variable delay circuit 23 through a terminal 24. The variable delay circuit 23 controls the phase of the color burst signal BTc0 in accordance with the level of the control signal VDC. In other words, the variable delay circuit 23 generates a color burst signal BTc1 for offsetting the difference of the phase of the sampling clock SCK against that of the color burst signal BTc and supplies the color burst signal BTc1 to a phase comparator 27 of the PLL circuit 26.

The PLL circuit 26 is used as a frequency synthesizer. The phase comparator 27 compares the phase of the color burst signal BTc1 with a signal S28 having a color subcarrier frequency fsc, the signal S28 being supplied from a frequency division circuit 28 thereby generating a phase error ER. The phase error ER is converted into a DC voltage with a low pass filter 29 and then supplied to a VCO 30.

The VCO 30 generates a signal S30 (4 fsc) with four phase as the color burst signal BTc1 in accordance with the output of the low pass filter 29 and outputs the signal S30 from a terminal 31. In addition, the signal S30 is supplied to the frequency division circuit 28. Thereby, the sampling clock SCK is generated in accordance with the signal S30 with frequency (4 fsc). The frequency division circuit 28 divides the frequency of the signal S30 by 4 thereby generating a signal S28. The signal S28 is supplied to the phase comparator 27 where the above mentioned phase comparison is performed.

In the above mentioned embodiment, the data DRYn and DRY(n−1) are digitally added during the period TBU, namely, when the color difference signals (R−Y) being demodulated and sampled on the adjacent n-th line and the (n−1)th line are in accordance with the color burst signals BTc. Thereby, the direction and amount of the phase difference between the sampling clock SCK and the color burst signal BTc at that time can be detected. The information is output as the PWM signal. With the PWM signal, the phase of the sampling clock SCK can be synchronized with the color burst signal BTc. Thus, the D/A converter and the associated circuit blocks which are required in the prior art can be omitted. Moreover, the phase of the sampling clock SCK can be synchronized with the color burst signal BTc in a very simple construction. Consequently, without the necessity D/A converter and the associated circuit blocks which are externally provided in the prior art, a circuit block with for synchronizing the sampling clock SCK with the color burst signal BTc can be constructed with an IC chip.

Furthermore, according to the above mentioned embodiment, the present invention can be applied to each of the NTSC system, PAL system, and the PAL-M system in the same construction.

The burst phase detection circuit according to the present invention calculates color difference signals of two adjacent lines, detects the direction and amount of phase difference between the sampling clock and the color burst, outputs the resultant signal as a PWM signal, and controls the sampling clock with the PWM signal so that the phase of the sampling clock is in synchronization with that of the color burst signal. Thus, the burst phase detection circuit can synchronize the sampling clock with the color burst signal in a very simple construction without the necessity of a D/A converter and the associated circuit blocks which are required in the prior art. Therefore, without the necessity for a D/A converter and the associated circuit blocks which are externally provided, a circuit block for synchronizing the sampling clock with the color burst signal can be constructed as an IC chip.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A burst phase detection circuit for detecting a phase difference between an input burst signal having a predetermined phase relation with a carrier of a modulated color signal and a sampling pulse, based upon a digital signal obtained by demodulating the color signal in accordance with a demodulated axis of one of first and second color difference signals of said color signal, comprising:

first sampling means for sampling a value of said digital signal during an interval of said burst signal within a first horizontal line period of said color signal;

second sampling means for sampling a value of said digital signal during an interval of said burst signal within a second horizontal line period of said color signal;

digital addition means for adding the values of said digital signal sampled by said first sampling means and said second sampling means to produce an addition signal; and detection means for digitally detecting a direction and an amount of a phase difference between said sampling pulse and said burst signal based on said addition signal and producing a detection signal representing the direction and amount of said phase difference.

2. The burst phase detection circuit as set forth in claim 1, wherein the first and second sampling means are operative to sample a digital signal obtained by demodulating a color video signal conforming with one of the NTSC system and the PAL system.

3. The burst phase detection circuit as set forth in claim 1, wherein said detection means is operative to generate said detection signal in the form of a detection pulse having a polarity based on a polarity of the addition signal and having a pulse width based on an absolute value of said addition signal.

4. The burst phase detection circuit as set forth in claim 3, wherein said detection means comprises sign bit producing means for producing a sign bit representing the polarity of said addition signal, a tri-state circuit having an input coupled with the sign bit producing means to receive the sign bit; absolute value means for producing an absolute value signal representing the absolute value of the addition signal; and control pulse generation means operative to produce a control pulse having a pulse width based on said absolute value signal for gating said tri-state circuit to output said detection pulse having a polarity based on the sign bit and a pulse width based on the absolute value signal.

5. The burst phase detection circuit as set forth in claim 1, in combination with sampling signal producing means for producing said sampling signal in synchronization with said burst signal based on said detection signal.

* * * * *